US008151628B1

(12) United States Patent
Smida

(10) Patent No.: US 8,151,628 B1
(45) Date of Patent: Apr. 10, 2012

(54) HYDROSTATIC TEST TOOL AND METHOD OF USE

(75) Inventor: Charles R. Smida, Isanti, MN (US)

(73) Assignee: Airmo, Inc., Minneapolis, MN (US)

( * ) Notice: Subject to any disclaimer, the term of this patent is extended or adjusted under 35 U.S.C. 154(b) by 417 days.

(21) Appl. No.: 12/483,462

(22) Filed: Jun. 12, 2009

Related U.S. Application Data

(60) Provisional application No. 61/060,986, filed on Jun. 12, 2008.

(51) Int. Cl.
G01M 3/26 (2006.01)

(52) U.S. Cl. ...................................... 73/37; 73/40; 73/52

(58) Field of Classification Search ................ 73/37, 40, 73/49.2, 52
See application file for complete search history.

(56) References Cited

U.S. PATENT DOCUMENTS

| | | | |
|---|---|---|---|
| 2,539,843 A * | 1/1951 | Kerr ................................. 73/37 |
| 2,592,984 A * | 4/1952 | Walling ............................ 73/37 |
| 2,652,717 A * | 9/1953 | Bush et al. .................. 73/40.5 R |
| 2,658,386 A * | 11/1953 | Guichard .......................... 73/37 |
| 2,821,851 A * | 2/1958 | Daley ................................ 73/37 |
| 2,997,070 A * | 8/1961 | Penhale ........................... 138/90 |
| 3,411,341 A * | 11/1968 | Hortvet ............................ 73/37 |
| 3,762,213 A * | 10/1973 | Nowicki ........................ 73/45.3 |
| 3,805,593 A * | 4/1974 | Sandoz et al. ................. 73/49.2 |
| 3,895,514 A * | 7/1975 | Northup .......................... 73/49.4 |
| 3,951,185 A * | 4/1976 | Bower et al. ..................... 141/1 |
| 4,103,537 A * | 8/1978 | Victor ......................... 73/40.5 R |
| 4,285,230 A * | 8/1981 | Hartness ......................... 73/49.4 |
| 4,419,884 A * | 12/1983 | Grenci et al. .................. 73/49.8 |
| 4,474,055 A * | 10/1984 | Bergeron, Jr. ................. 73/49.5 |
| 4,528,840 A * | 7/1985 | Wass ................................ 73/37 |
| 4,581,919 A * | 4/1986 | Sullivan ......................... 73/49.5 |
| 4,599,890 A * | 7/1986 | Girone et al. ..................... 73/37 |
| 4,646,561 A * | 3/1987 | Toelke ............................ 73/49.5 |
| 4,834,137 A * | 5/1989 | Kawaguchi et al. .......... 137/557 |
| 5,548,992 A * | 8/1996 | Hallett et al. .................. 73/49.2 |
| 5,581,018 A * | 12/1996 | Allen et al. ..................... 73/49.8 |
| 5,979,222 A * | 11/1999 | Manalio ........................... 73/37 |
| 6,062,075 A * | 5/2000 | Ritz et al. ........................ 73/168 |
| 6,826,957 B2 * | 12/2004 | Martone et al. ............ 73/40.5 R |
| 7,543,479 B2 * | 6/2009 | Thomas et al. .................... 73/37 |
| 7,607,456 B1 * | 10/2009 | Schulz et al. ..................... 138/89 |
| 7,934,415 B2 * | 5/2011 | Smida et al. ..................... 73/37 |
| 2003/0029244 A1 * | 2/2003 | Nakayasu et al. ............. 73/730 |

* cited by examiner

Primary Examiner — David Rogers
(74) Attorney, Agent, or Firm — Moore & Hansen, PLLC

(57) ABSTRACT

Hydrostatic testing tool and methods for testing a test article, such as a hose or container having an external threaded aperture. The preferred testing tool includes a housing, a piston and a collet body having a plurality of collet segments collectively forming a cylindrical inner perimeter having a variable diameter, each collet segment having a threaded surface on the inner perimeter such that the piston can selectively actuate the collet body to vary the diameter of the inner perimeter. In preferred embodiments, the hydrostatic testing tool utilizes a handle assembly that is arranged and configured such that only one hand is needed to operate the hydrostatic testing tool.

17 Claims, 11 Drawing Sheets

US 8,151,628 B1

HYDROSTATIC TEST TOOL AND METHOD OF USE

RELATED APPLICATIONS

The present application claims priority to U.S. Provisional Application Ser. No. 61/060,986, filed Jun. 12, 2008, entitled, "Hydrostatic Test Tool and Method of Use", which is hereby incorporated herein by reference.

BACKGROUND OF THE DISCLOSURE

1. Field of the Invention

The present invention relates generally to hydrostatic test tools and methods of use. Particularly, the present invention relates to hydrostatic test tools for pressure testing articles including an aperture having a threaded outer surface. More particularly, the present invention relates to hydrostatic test tools that can be operated with a single hand. Even more particularly, the present invention relates to a hydrostatic testing tool having a plurality of collet segments having a threaded inner diameter that can expand inwardly to engage and outwardly to disengage the test article.

2. Description of the Related Art

Hydrostatic testing tools are used for testing the strength and integrity of test articles such as bottles, containers, pressure carrying hoses and the like. The test article generally has a filler/discharge aperture with an external, threaded female coupling or fitting. Typical containers and hoses to be tested must be able to safely contain gases or liquids stored at high pressures. The containers and hoses are generally tested for strength using pressure techniques, which require an air tight seal between the test tool and the test article.

Each article to be tested will have an external thread on its filler/discharge aperture. When these articles are tested, the test equipment is usually attached to the threaded aperture of the articles in one of two known ways. The first method is to rotate a threaded end of the testing tool onto the threaded aperture of the article to produce a tight seal. This method generally requires complex automated equipment to do the threading and unthreading needed to connect the testing tool to the large quantity of articles that are typically tested in a given time interval. This threading and unthreading could be done by hand, but in any case, the test process is extremely time consuming, which limits the rate of test production.

The present invention addresses limitations and problems associated with the related art.

SUMMARY OF THE INVENTION

The present invention provides a hydrostatic testing tool and methods for testing a test article, such as a hose or container including an aperture having a threaded outer surface. The preferred testing tool includes a body or housing having a front cap, a rear head and a middle portion interconnecting the front cap and the rear head. The front cap preferably includes a collet body having a plurality of collet segments collectively forming a cylindrical inner perimeter having a variable diameter. Each collet segment having a threaded surface on the inner perimeter such that an internal piston can selectively actuate the collet body to vary the diameter of the inner perimeter. In preferred embodiments, the hydrostatic testing tool utilizes a handle assembly to actuate the piston that is arranged and configured such that only one hand is needed to operate the hydrostatic testing tool.

Preferred embodiments provide a hydrostatic testing tool that may be quickly secured and unsecured to a fitting having a threaded outer surface of a test article, such as a hose or the like. Moreover, preferred embodiments provide a hydrostatic testing tool that is durable, provides a reliable seal and cannot generally become dislodged from the threaded outer diameter during normal testing conditions. The most preferred embodiments are configured such that test articles can be tested to up to at least about 30,000 psi.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts;

FIG. 6 is an enlarged cross-sectional view of the testing tool 10 of FIG. 5a;

DETAILED DESCRIPTION OF THE PREFERRED EMBODIMENTS

Figure 1:
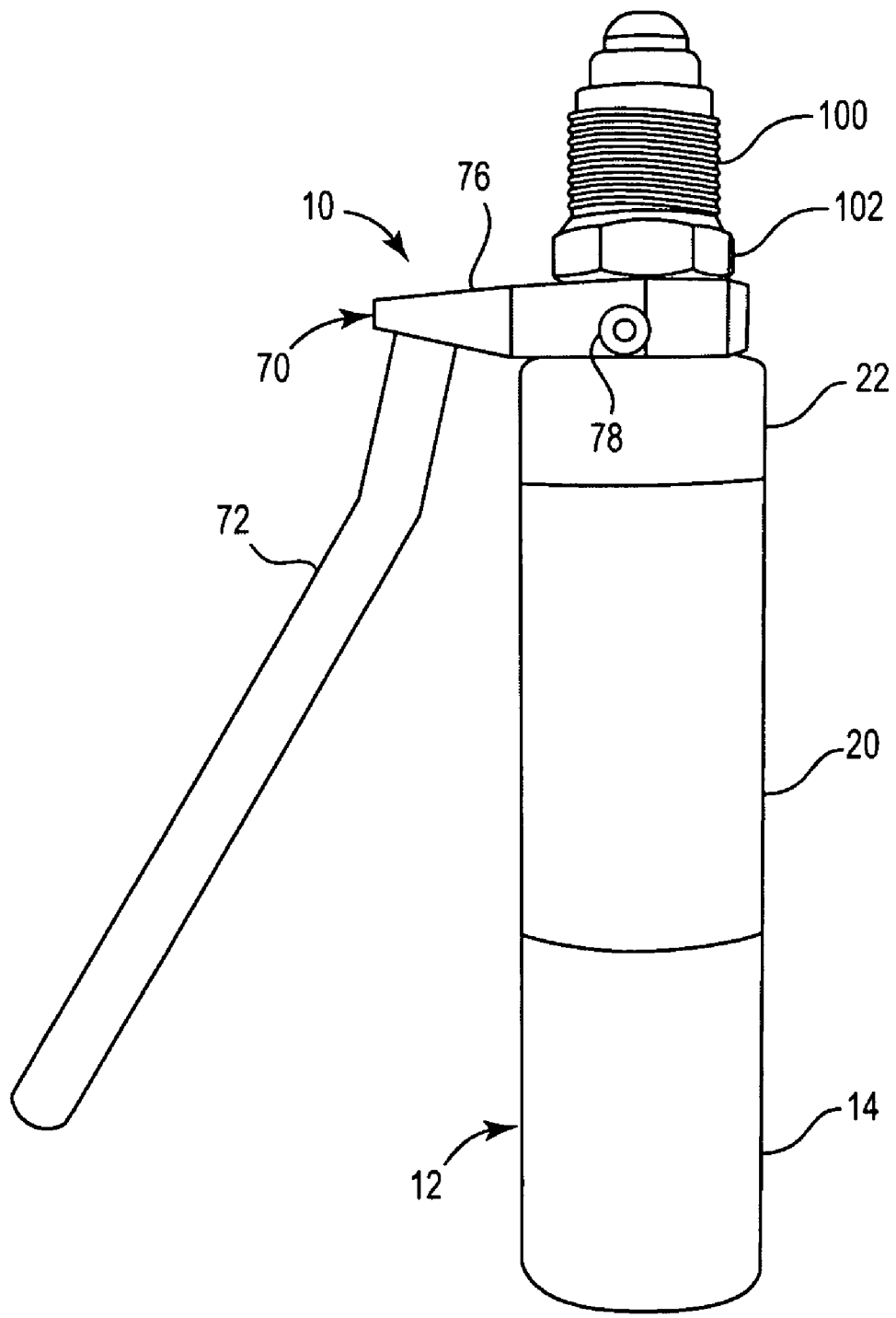
FIG. 1 is a plan view of a hydrostatic testing tool 10 in an "at rest" position.
Figure 2:
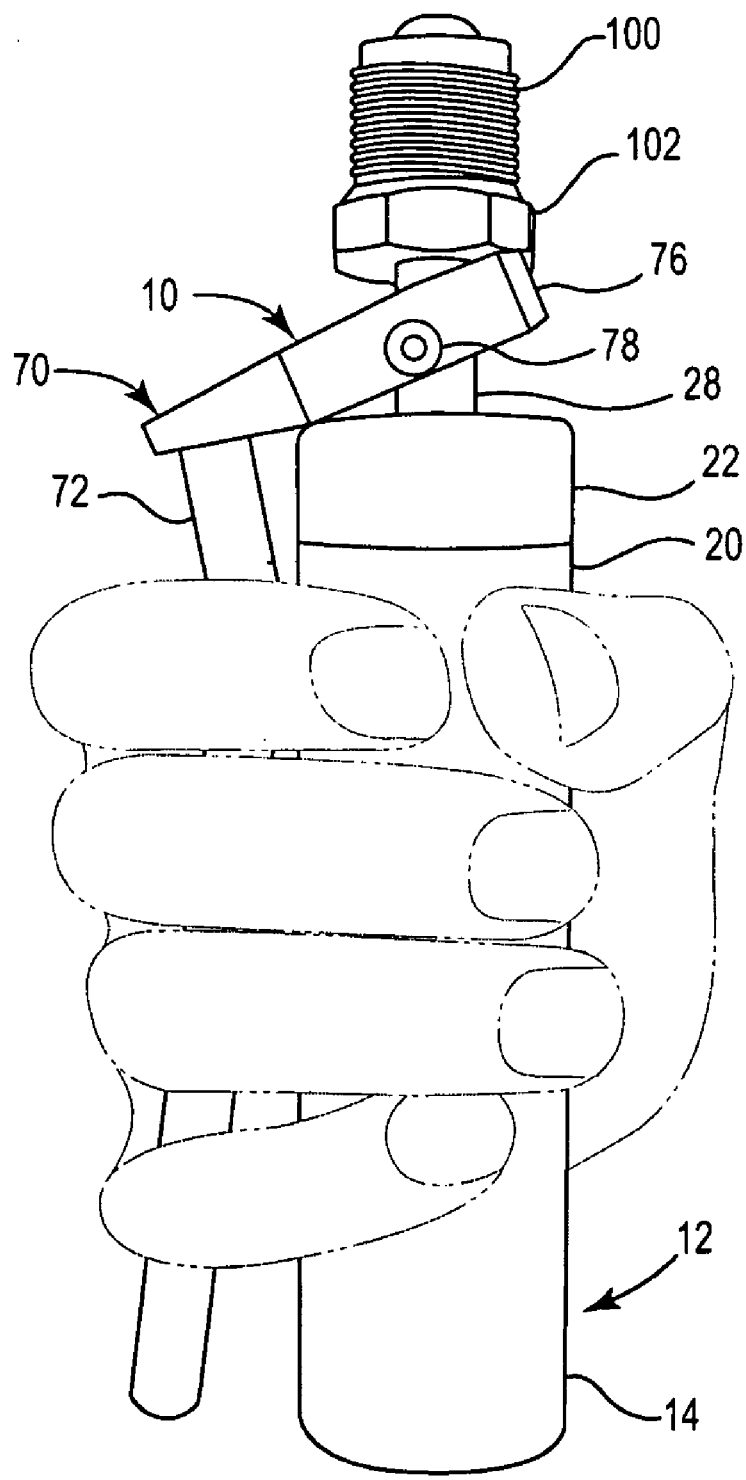
FIG. 2 is a plan view of the testing tool 10 of FIG. 1, the test tool 10 having a piston 28 that is in the withdrawn position.
Figure 3:
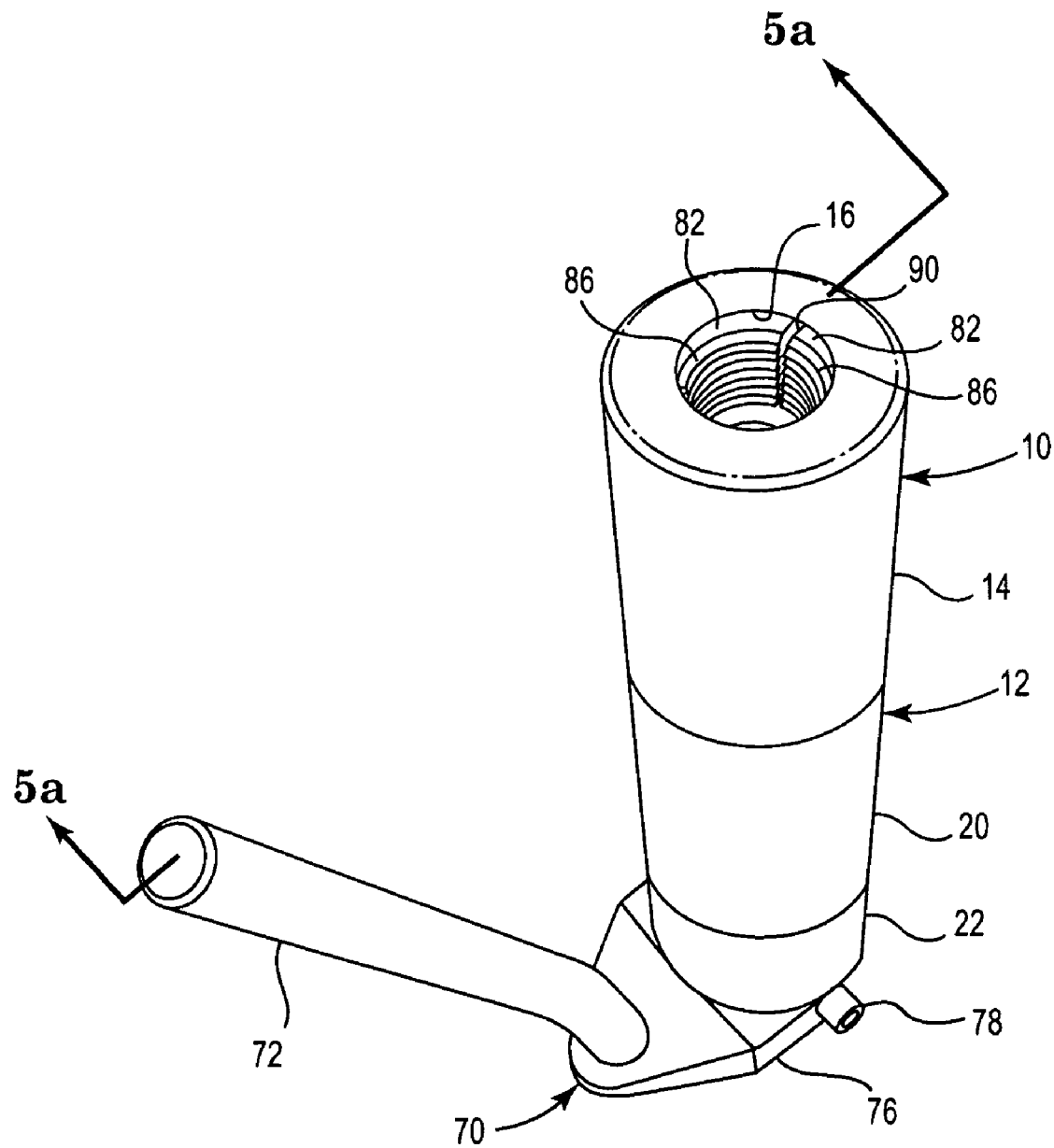
FIG. 3 is a bottom perspective view of the testing tool 10 of FIG. 1.
Figure 4:
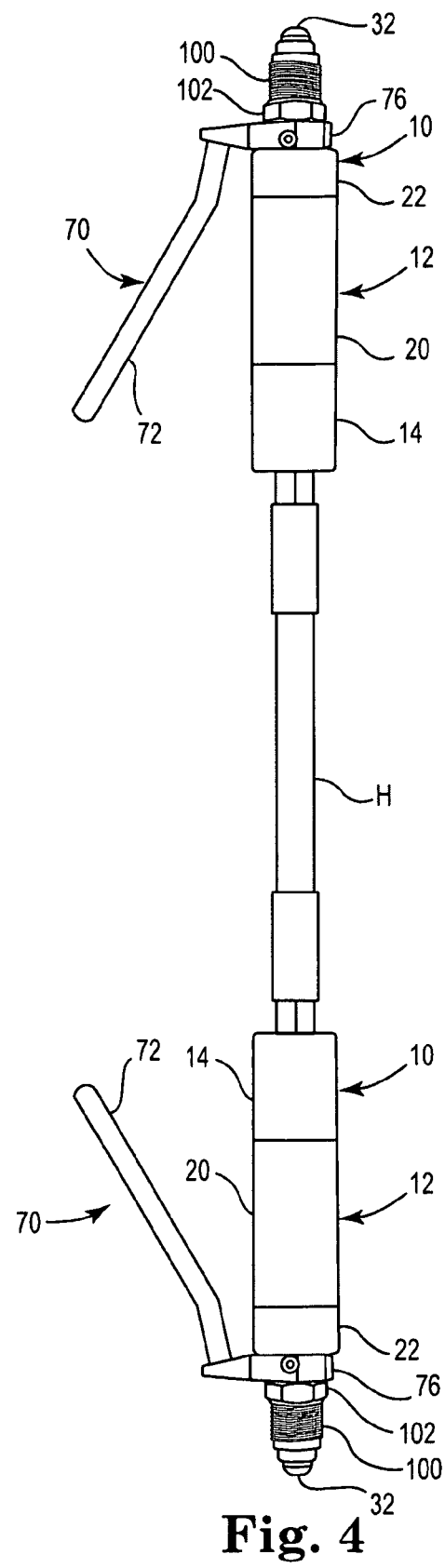
FIG. 4 is a plan view of two test tools 10 operatively connected to a test article H.

The preferred embodiments of the present invention are illustrated in FIGS. 1-10. The preferred hydrostatic testing tool 10 includes a body or housing 12 having a front cap 14, middle portion 20 and a rear head 22 each defining a generally hollow interior defined by a channel 24. The front cap 14, middle portion 20 and rear head 22 are preferably secured together with threaded connections. The front cap 14 preferably includes a collet body 80 having a plurality of collet segments 82 collectively forming a cylindrical inner perimeter 84 having a variable diameter "D", each collet segment 82 having a threaded surface 86 on the inner perimeter 84 such that a piston 28 can move the collet segments 82 to selectively vary the diameter "D" of the inner perimeter 84. In preferred embodiments, the hydrostatic testing tool 10 is actuated by a handle assembly 70 that engages the piston 28 and is arranged and configured such that, generally, only one hand is needed to operate the hydrostatic testing tool 10.

The piston 28 extends within the channel 24 of the housing 12 and out of the housing 12 from the rear head 22. The piston 28 further includes a center orifice 30 having an inlet aperture 32 that can be sealably attached in any known way to a source of high-pressurized fluid material (not shown), preferably liquid or gas, for testing of a test article. It should be understood that although the inlet aperture 32 is described as for receiving liquid, the testing tool of the present invention will work with gases as well. The preferred piston 28 further includes a radial groove 40 in which a lip 88 of the collet body 80 may be positioned to generally secure the collet body 80 to the piston 28. The preferred groove 40 is sized to allow for some individual movement and adjustment of each collet segment 82 with respect to the other collet segments.

All of the collet segments 82, when properly aligned with each other, cooperate to define the generally continuous threaded inner perimeter 84, which generally corresponds to the threaded outer surface T of a fitting or aperture F of the test article H. The generally continuous threaded inner perimeter 84 is separated by the area or gaps 90 between the respective collet segments 82, the gaps 90 are largest when the collet segments 82 are in an expanded position (see, FIG. 10).

It will be further appreciated that the test tool embodiments of the present invention can be used with test articles other then hoses or hose fittings and the present invention should not be construed to be limited to use with any particular type of test article.

Figure 5A:
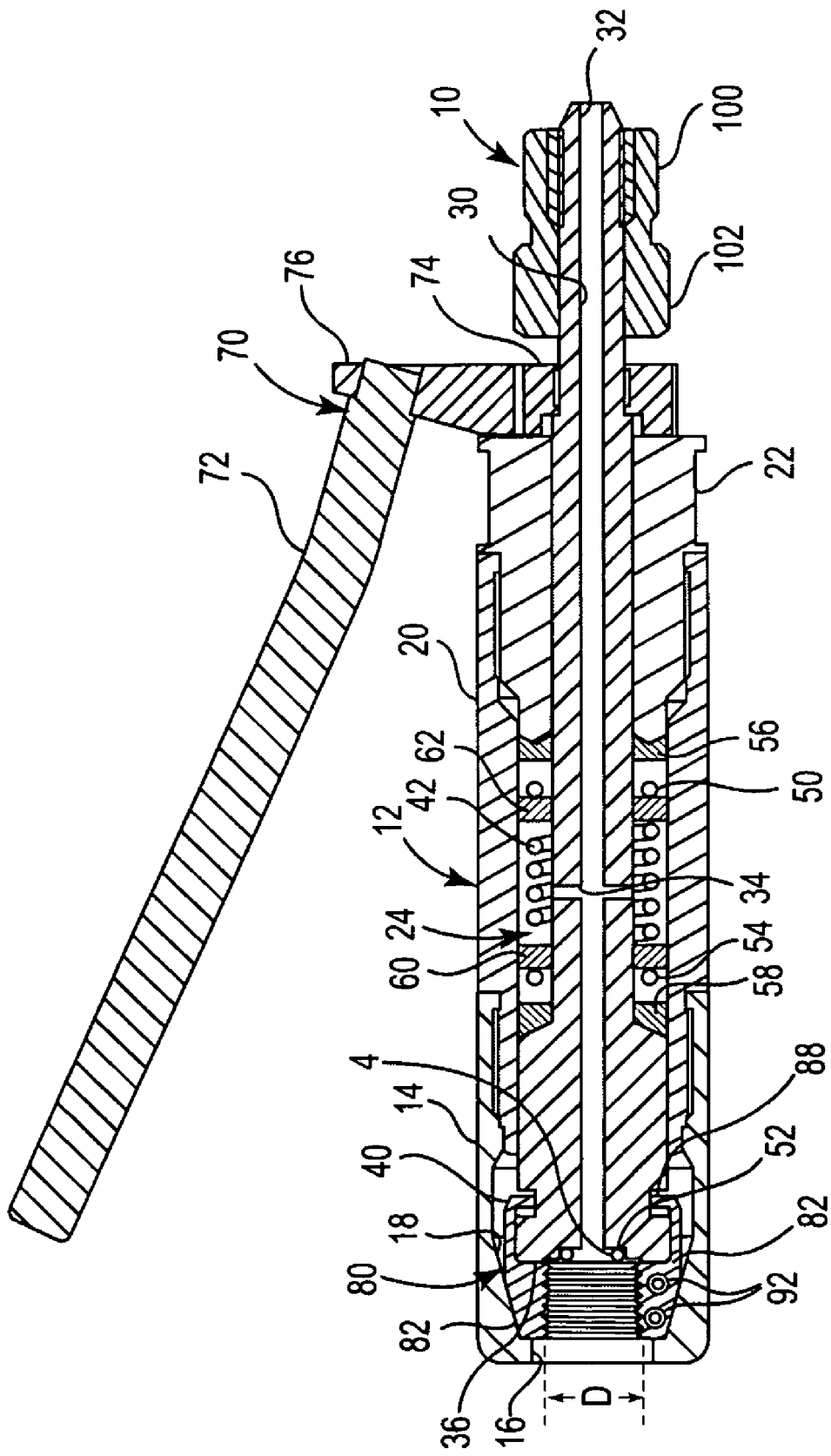
FIG. 5a is a cross-sectional view of the testing tool 10 as viewed along line 5a-5a of FIG. 1, wherein the piston 28 is in the forward position.
Figure 5B:
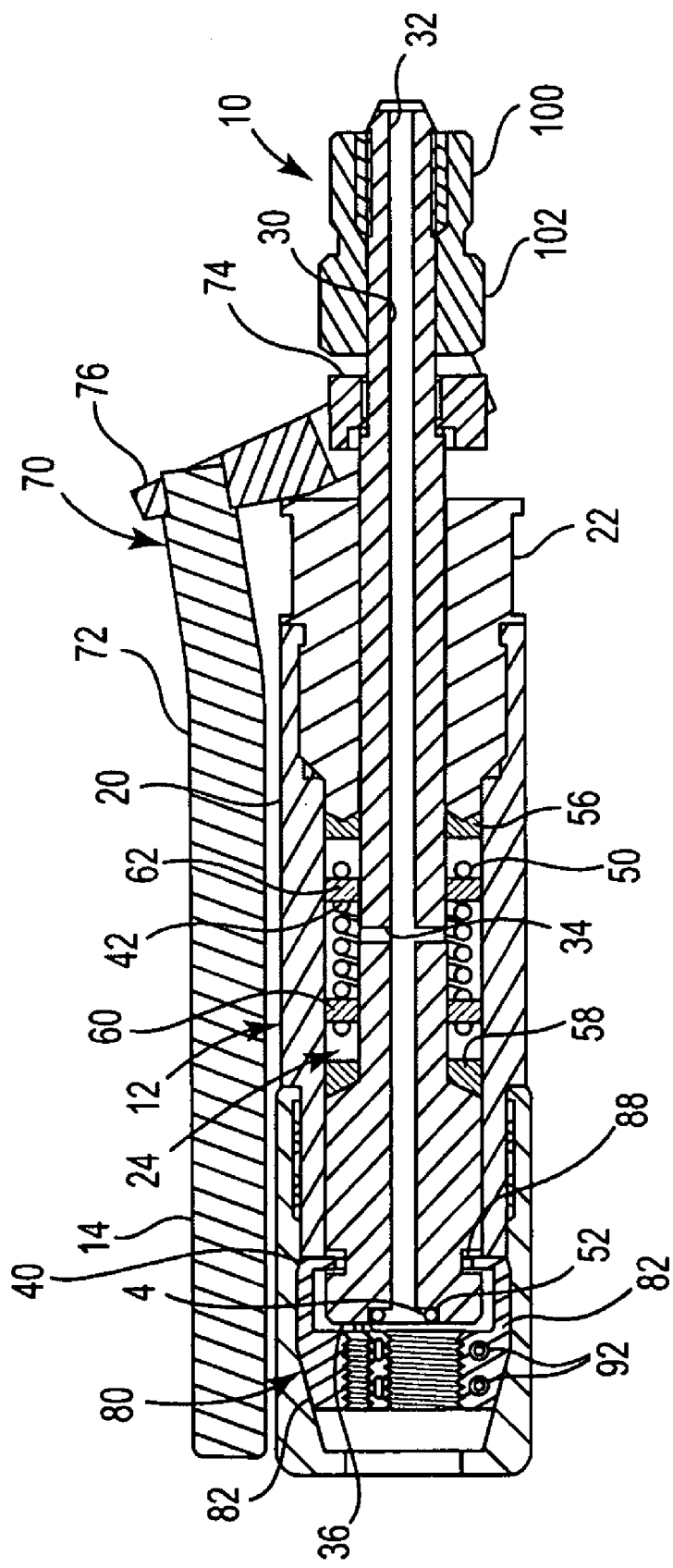
FIG. 5b is a cross-sectional view of the testing tool 10 of FIG. 1, wherein the piston 28 is in the withdrawn position.
Figure 6:
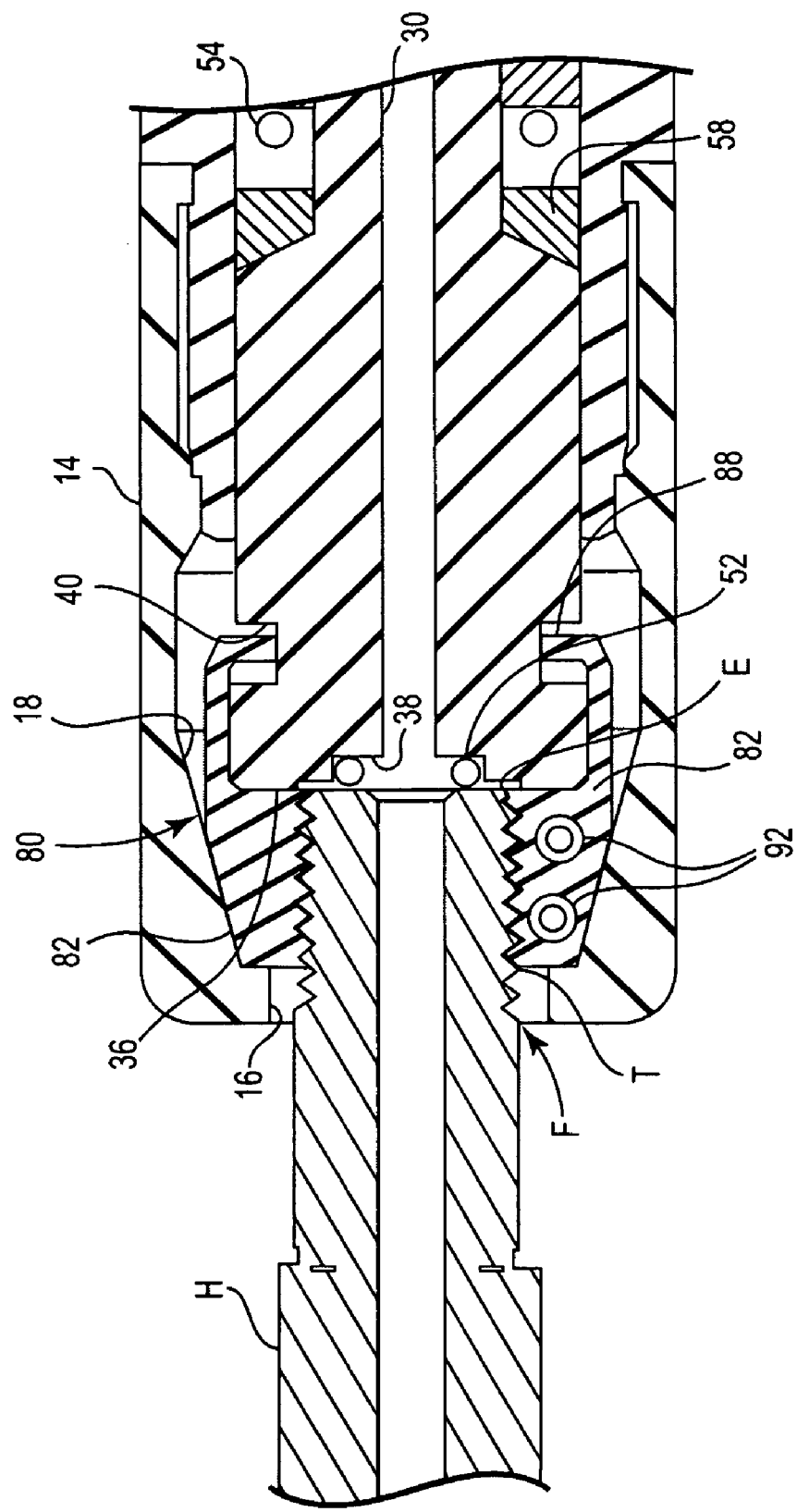
Figure 7:
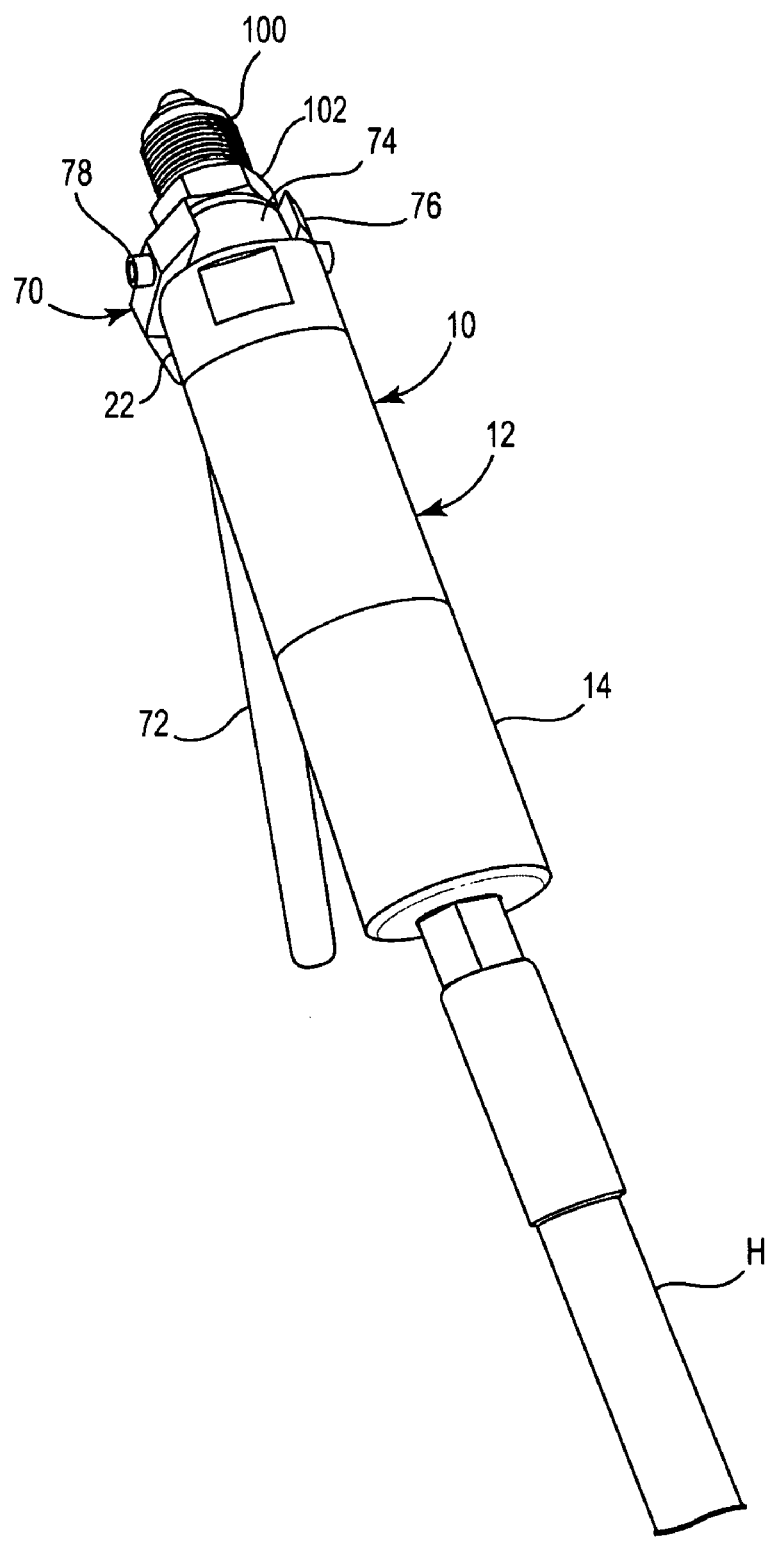
FIG. 7 is a perspective view of the testing tool 10 of FIG. 1 connected to the test article H.
Figure 9:
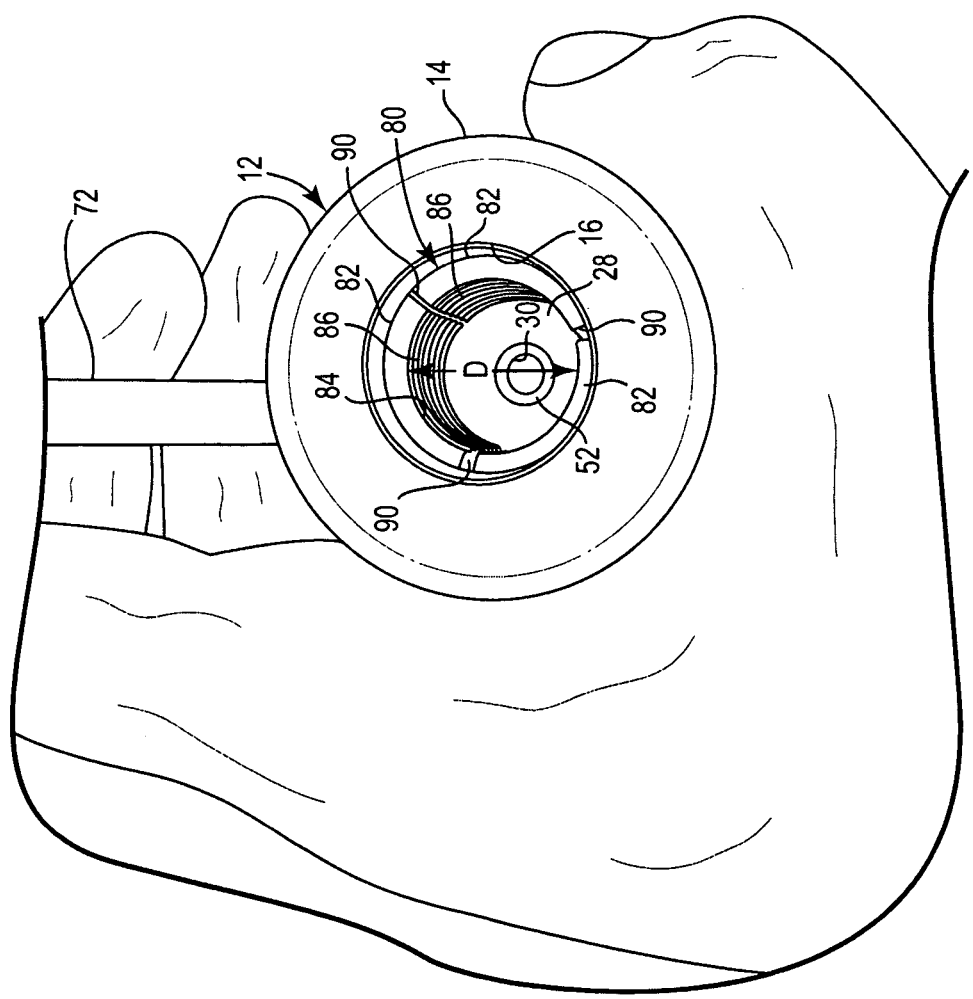
FIG. 9 is a bottom view of the test tool 10 of FIGS. 1-5 and 7-8 when the piston 28 is in the forward position.
Figure 10:
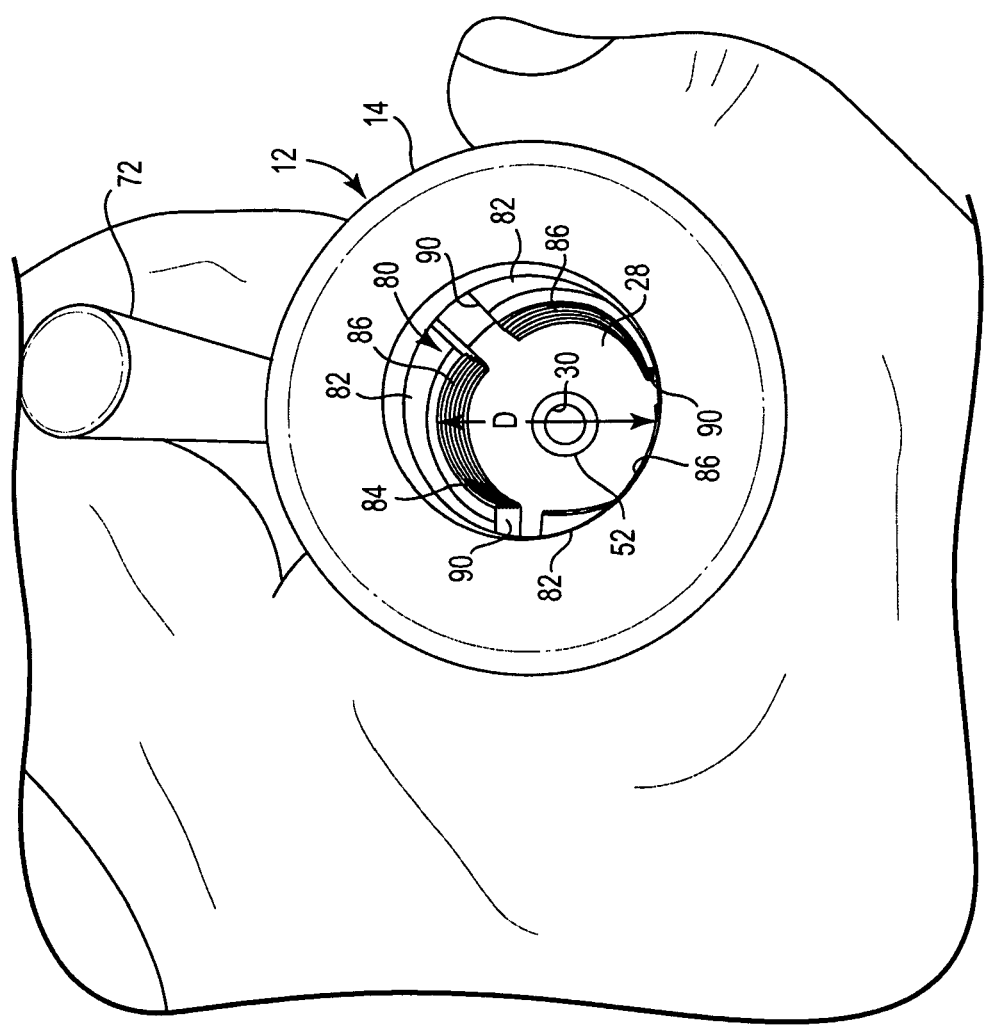
FIG. 10 is a bottom view of the test tool 10 of FIGS. 1-5 and 7-9 when the piston 28 is in the withdrawn position.

In the testing tool's 10 at rest state, when the piston 28 is in the forward position, the segmented threaded collet segments 82 are preferably in the closed or unexpanded position (see, FIGS. 5a and 9, respectively). In this state, an internal compression spring 42 pushes the piston 28 against the collet segments 82 into the front cap or head 14 (see, for example, FIG. 5a). In preferred embodiments, the test tool 10 is arranged and configured such that the channel 24 narrows proximate the opening 16 to form a ramp 18 having an angle such that the ramp will force the segments 82 to draw closer to each other in a generally closed position. Moreover, the collet body 80 slides along the ramp 18 as the piston 28 pulls the collet body 80 to and from the open and closed positions. When the piston 28 is in the forward position as is illustrated in FIG. 5a, the collet segments 82 are in the unexpanded position and when the piston 28 is in the withdrawn position as is illustrated in FIG. 5b, the collet segments 82 are in the expanded position.

The preferred test tool 10 is actuated with a handle assembly 70. The preferred handle assembly 70 includes a collar 74 that is fixedly attached to the piston 28, proximate the rear head 22. The collar 74 is secured to a handle plate 76 and the handle plate is pivotally secured to a lever or shaft 72, preferably with a pivot screw 78. When the lever 72 is squeezed toward the body 12, the handle plate 76 pivots on the rear head 22 and pushes the collar 28 toward gland nut 102. When the lever 72 is squeezed toward the body 12, the collar 74 slides toward the gland nut 102, thus pulling the piston 28 in the same direction. The movement of the piston 28 from the forward position into the withdrawn position (toward the gland nut 102) correspondingly pulls the collet segments 82 in the same direction, along the ramp 18 and into an expanded position. Preferably, the lever 72 is biased such that the collet segments 82 are in the closed position when the testing tool 10 is at rest.

As previously discussed, by squeezing the lever or shaft 72, the collet segments 82 are preferably pulled backwards into the channel 24 by the piston 28. Biasing members or springs 92 located between adjacent threaded collet segments 28, bias outwardly and separate the collet segments 82 so that the aperture F, in this case the hose fitting, can be inserted into an opening 16 of the front cap 14 and within the variable diameter D of the inner perimeter 84 of the collet segments 28. The hose fitting F is inserted into the opening 16 of the front cap 14, preferably until an edge or end E of the hose fitting F comes to a positive stop against o-ring 52, which is secured in a groove 38 at the front end 36 of piston 28. In preferred embodiments, the collet segments 28 are designed to closely match the outer threaded surface T of the hose fitting F of the test article H to be tested. Once the hose fitting F is pressed against the o-ring 52, the squeezed handle shaft 72 is to be released. By releasing the handle shaft 72, the spring 42 will push the piston 28 towards the front cap 14 and allow the collet segments 82 to align their respective threads 86 on the outer threaded surface T of the hose fitting F thereby causing a gripping or clamping action.

The collet body 80 is preferably, first formed as an integral, cylindrical stainless steel unit, and the threaded surface 86 is then cut into the inner perimeter 84 near the front end of the collet body 80 so as to correspond to the threaded outer surface of the test articles to be tested. The collet body 80 is preferably cut into three collet segments 82, or, alternatively, as many or as few collet segments as desired. It should be noted that the threaded surface 86 on each collet segment 82 is likely to be different in alignment from the other collet segments, and, therefore, the collet segments are preferably aligned in the same order as that which existed before cutting in order that the threaded surfaces as a whole retains its original nature on the assembled collet body 80.

When the collet segments 82 are in the fully disengaged position, the cylindrical inner perimeter 84 should have a diameter "D" larger than the diameter of the fitting F of the test article H. When the collet segments 82 are in a radially engaged or closed position, the original diameter "D" of the cylindrical inner perimeter 74 is decreased to the second diameter that closely matches, tightly engages and retains the fitting F.

The use of the springs 92 within the spaces or gaps 90 between the separate collet segments 82 allow the collet segments 82 to generally move forwardly or rearwardly, slightly and independently of each other so as to have their respective threaded surfaces 86 be more self-aligning with the threaded surface T of the aperture or fitting F and even to more readily engage the threaded surface when the threaded surface may be somewhat irregular or damaged.

The preferred testing tool 10 further includes a plurality of o-rings and seals 52, 54, 56, 58, 60, 62 positioned throughout the testing tool 10. These o-rings and seals 52, 54, 56, 58, 60, 62 function to seal the actuation of the internal parts of the tool 10 and their placement and usage will be apparent to one of ordinary skill in the art in light of this disclosure. The preferred o-rings and seals are made of BUNA (nitrile), but the preferred material may vary depending on the substance to be pressurized as will be determinable by one of ordinary skill in the art in light of this disclosure. It will be appreciated that o-rings made of other suitable materials may also be used.

Although the only test article illustrated is a hose, it will be appreciated that the hydrostatic testing tool can be used to test other various test articles having an aperture including a threaded outer surface, such as a container or the like.

When a test article 10 is to be tested, the collet segments 82 are placed in their disengaged positions so that the collet segments 82 fit over and around the threaded outer surface T of the fitting F. The expanded collet segments 82 are slidably positioned over and around the fitting F of the test article H. For test articles having two ends, such as a hose, one hydrostatic test tool is preferably secured to each end for testing (see, for example, FIG. 4). Then, a pressure source is preferably connected to one hydrostatic test tool 10 preferably by using collar 100 and gland nut 102. It will be understood that other connections can be used. On the opposite end of the hose H a second hydrostatic test tool 10 is attached using the same method as described below. The second tool, however, will preferably have an air bleed valve or the like when the pressurized medium is fluid (not shown) attached to the collar 100 and gland nut 102 connection instead of a pressure source (one preferred air bleed valve is a NuQuip™ Automatic Air Bleed valve available from Airmo, Inc. of Minneapolis, Minn.). It will be understood that an air bleed valve is preferred however, other valves and seals may be used in conjunction with the test tool as are commonly used in the art with other various hydrostatic testing tools.

In the test tool's 10 at rest state, the segmented threaded collet segments 82 are preferably closed or unexpanded. The spring 42 pushes the piston 28 against the collet segments 82 into the front cap 14. The ramp 18 of the channel 24 and the collet segments 82 are preferably arranged and configured to force the segments to generally contract such that they are close together as previously discussed.

The rear head 22 maintains seals 50, 54 backup rings 56, 58, spring 42, and seal retainers 60, 62 in place. The rear head 22 additionally helps to maintain the alignment of the piston 28 in relation to the rest of the test tool 10. The biasing members or springs 92 located between the threaded collet segments 82, separate the collet segments 82 so that the threaded fitting F, in this case the hose fitting, can be inserted between the collet segments 28. The hose fitting F is inserted into the test tool 10 through the opening 16 in the front cap 14 and between the collet segments 28 until the hose fitting F comes to a positive stop against the o-ring 52. The collet segments 82 are preferably designed to closely match the threaded surface T of the hose fitting or threaded aperture F of the test article H. Once the hose fitting F is pressed against the o-ring 52, the handle shaft 72 is released. By releasing the handle shaft 72, the spring 42 pushes the piston 28 towards the front cap 14 and allow the collet segments 82 to align their respective threads 86 on the threaded outer surface T of the fitting F thereby causing a gripping or clamping action. Movement of the collet segments 82 will be at least partially limited by the front cap 14 to prevent damage of the threaded surfaces 86 of the collet segments 28.

Once the hose fitting F is connected to the test tool 10, water or an alternative pressurized medium is introduced through an inlet aperture 32 of the center orifice 30 of piston 28. Once the pressurized medium exits the opposite end of the hose H and the second tool, a drain/shutoff valve (not shown) is closed and pressure will begin to build to the desired load. Examples of potential shutoff valves include BuTech Pressure Systems Model 30UV61V; Parker Hannifin Corp. Model BVHP16USS1VC valve; and Tescom Corporation Series 30 shutoff valves. Alternatively, a NuQuip™ Air Bleed valve, available from Airmo, Inc. of Minneapolis, Minn., or the like can be used which will allow the air to "bleed" out of the hose when gas is the pressurized medium. If the pressurized medium is a gas (i.e. helium), a vacuum may be created and then the test article may be backfilled with the pressurized gas. Alternatively, for example, if the test article is a hose and the pressurized medium is a gas, a test tool can be secured to each end of the hose, wherein one test tool is connected to a drain/shutoff valve and the other is connected to a source of pressurized gas. The shutoff valve can be opened and the pressurized gas can be introduced through the hose as to force out the air. After it is believed that the air has been forced out of the hose, the shutoff valve can be closed as to begin building up pressure within the hose.

It will be understood that the present invention can be used with or without complex valves and draining equipment. As pressure builds within the test tool, the clamping pressure from the collet segments 28 is increased on the hose fitting threads T and the o-ring 52 is forced onto the front end E of the hose fitting F increasing its sealing capability. This is preferably accomplished by having pressure build from a small orifice or bleed hole 34 located laterally outward to the outside diameter of the piston 28 and forcing the piston 28 to be pushed towards the front cap 14. The pressure outside of the piston 28, between seal retainers 60, 62, builds its pressure against the seal 50, seal 54, backup ring 56, backup ring 58, body 12 and rear head 22. Seal retainers 60, 62 ensure the seals 50, 54 remain in a position to function properly. If the seals 50, 54 "roll" or are not aligned with the piston 28 and the body 12, pressure will not be allowed to build up and the clamping or gripping force will be reduced. The preferred embodiments of the present invention are greatly advantageous as they will generally provide a device that can be test up to about 30,000 psi, which is a significant increase as compared to known devices.

Once the test is complete, the pressure source is turned off and the drain or shutoff valve (not shown) is opened on the opposite tool to release the pressurized medium. To remove the test tool 10, preferably the handle lever 72 is squeezed toward the body 12 which retracts the piston 28 and collet segments 82 away from the front cap 14 as discussed above. This allows the springs 92 to expand the collet segments 82 away from the hose fitting F and allows removal of the hose fitting F from the test tool TT.

Figure 8:
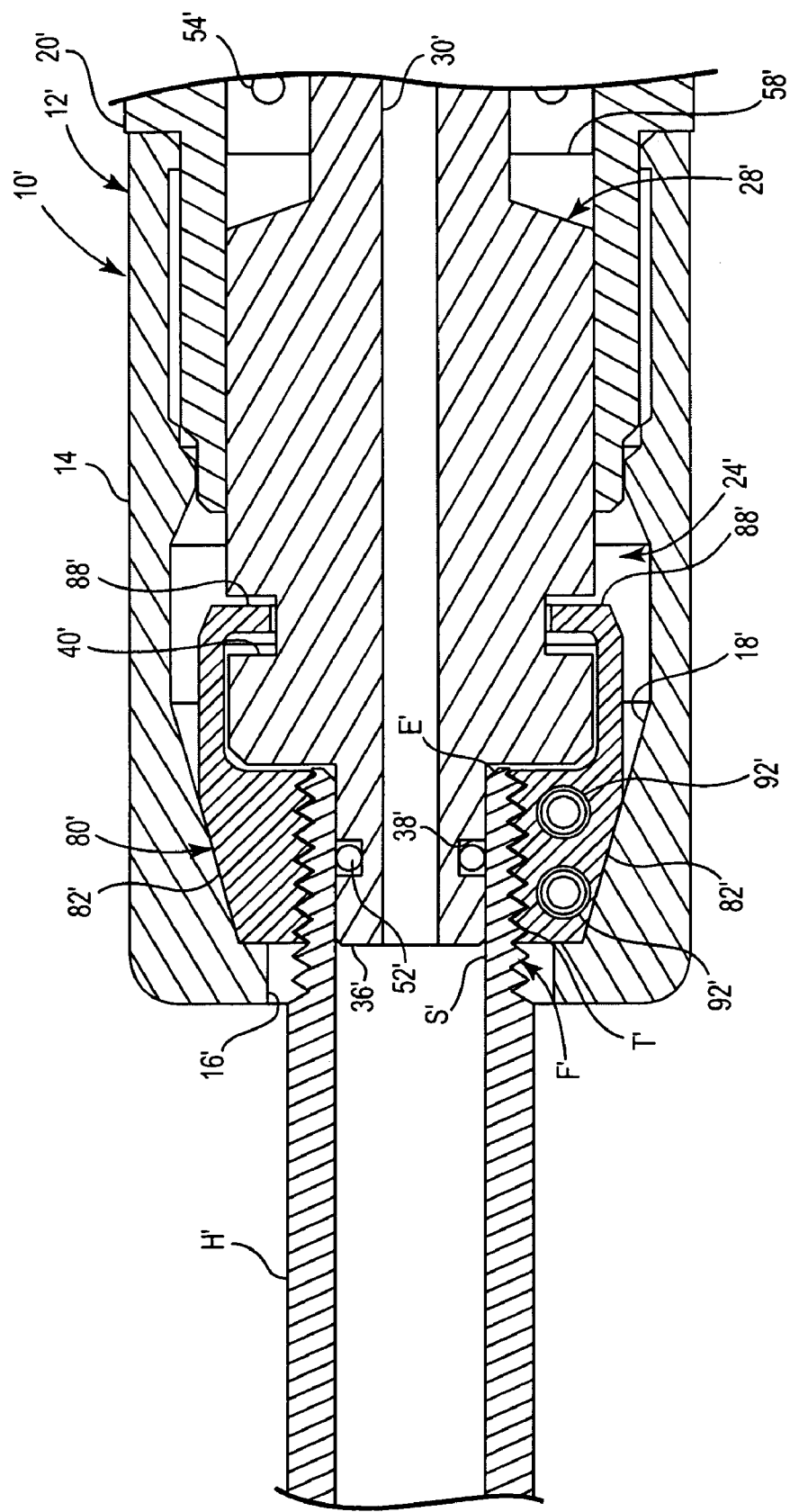
FIG. 8 is an enlarged cross-sectional view of an alternate testing tool 10', similar to that shown in FIGS. 5 and 6.

Now also referring to FIG. 8, in which an alternate preferred embodiment of a test tool TT' is partially illustrated. This test tool TT' is preferably used for testing articles H' having a fitting F' with an irregular end surface E' such that the seal 52' of the embodiment of FIGS. 1-7, 9-10 would not create a tight enough seal to effectively pressure test the article. In this embodiment, the test tool TT' is largely similar to the embodiment shown in FIGS. 1-7, 9-10, except, in this embodiment, the test tool 10' includes seal 52' arranged and configured to contact the inner surface S' of the fitting F'. It is noted that any elements not illustrated in FIG. 8 are identical to those of the previously described embodiment that is illustrated in FIGS. 1-7, 9-10. The differences between the embodiment previously discussed and the embodiment of FIG. 8, includes a piston 28' including a front end 36' including seal 52' and is arranged and configured such that the front end 36' can be inserted within the fitting F' of the test article H' such that the seal 52' can form a seal from within the fitting or aperture F', which would likely have a generally smooth surface to result in an effective seal between the seal 52' and the fitting F'.

In operation, a water or alternative pressure source supply (not shown) is connected to the testing tool 10' by using the connection point, collar and gland nut (see, FIGS. 1-7, 9-10 and related disclosure). For test articles having two open ends, on the opposite end of the test article or hose H a matching test tool is preferably attached using the same method as described herein. However, the opposite test tool will preferably have a drain/shutoff valve, preferably an air bleed valve, attached to the collar and gland nut connection instead of a water pressure source to at least temporarily seal off the second inlet to being building pressure.

In the test tool's 10' at rest state, the segmented threaded collet segments 82' of collet body 80' are biased in the closed position. Spring pushes piston 28' against the collet segments 82' into the front cap 14' (see also, spring 42). The preferred piston 28' for this embodiment includes a protruding front end 36' including a groove 38' for seal 52' and is arranged and configured such that the front end 36' can be inserted within the fitting F' of the test article H such that the seal 52' can form a seal with the inner surface S' of the fitting F'.

By squeezing the shaft 72 of the handle assembly 70 (see handle assembly 70 as shown and discussed herein), the collet segments 82 are pulled backwards into the tool 10' by the piston 28'. Springs 92' or alternative biasing members located between the threaded collet segments 82', separate the collet segments 82' so that the hose fitting or alternative threaded aperture F can be inserted into the respective test tool 10'. The hose fitting F' is inserted into the test tool 10' through the opening 16' in the front cap 14' until it comes to a positive stop against the piston 28'. Preferably, an o-ring or seal 52' is positioned within a groove 38' the front end 36' of the piston 28' will form a seal against the inside surface S' of the hose fitting F'. The preferred collet segments 82' are designed to generally match the threaded surface T' of the hose fitting F'. Once the hose fitting F is pressed against the piston 28', the shaft 72 of the handle assembly 70 is released. By releasing the handle assembly 70, the spring 42' will push the piston 28' toward the front cap 14' and allow the collet segments 28' to align their respective threads on the hose fitting F' causing a gripping/clamping action. In preferred embodiments, the channel 24' narrows to form the ramp 18' and the angle of the collet body 80' will force the collet segments 82' to close.

Once the hose fitting F' is operatively engaged, water or an alternative pressurized medium is introduced through the piston 28' center orifice 30'. Once the water exits the opposite end of the hose H' through the matching test tool 10', the drain/shutoff valve (not shown) or the like is closed and pressure will begin to build to the desired load. As water pressure builds, the clamping pressure from the collet segments 82' is increased on the hose fitting threads T' and ensuring the o-ring 52' remains inside of the hose fitting F'. This can be accomplished by having water pressure build from a small orifice (see, bleed hole 34 as discussed and shown herein) located laterally outward to the outside diameter of the piston 28' and forcing the piston 28' be pushed towards the front cap 14'. The water pressure outside of the piston 28' builds its pressure against the seal 50', seal 54', the backup rings 58', body 12 and rear head (see also, rear head 22 and backup ring 56 as shown and discussed herein).

Once the test is complete, the water pressure source is turned off and the drain/shutoff valve or the like is opened on the opposite test tool 10' to drain the water. To remove the tool 10', the handle lever is squeezed toward the body 12 which retracts the piston 28' and collet segments 82' away from the front cap 14'. This allows the springs 92' to expand the collet segments 82' away from the respective hose fitting F and allows removal of the hose fitting F from the respective test tool 10'. Any elements and/or characteristics of the alternate embodiment of FIG. 8, as described above, that are not shown in FIG. 8 are preferably configured and arranged to operate in accordance with the disclosure for FIGS. 1-7, 9-10.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A hydrostatic testing tool for testing a test article including a fitting having threaded outer surface and an end surface, the hydrostatic testing tool comprising:
    a housing including a front cap and a generally hollow interior defined by a channel; the front cap having an opening in communication with the channel;
    a piston at least partially located within the channel; the piston being biased toward the front cap in a forward position; wherein the channel narrows proximate the front cap; the piston further including an orifice extending along the length of the piston; the orifice having an inlet aperture;
    a collet body located within the channel proximate the opening in the front cap, the collet body having a plurality of collet segments collectively forming a generally cylindrical inner perimeter having a variable diameter, each collet segment having a threaded surface on the inner perimeter; wherein the piston is engaged with the collet body when the piston is in the forward position and, pushes the collet body against the front cap in an unexpanded position and wherein the collet body is in an expanded position when the piston is in a withdrawn position;
    wherein the fitting of the test article can be inserted at least partially into the opening for testing when the piston is withdrawn and collet body can be secured around the fitting after the fitting is inserted at least partially into the opening when the piston moves from the withdrawn position to the forward position; wherein a source of pressurized medium can be connected to the inlet aperture such that the pressurized medium can flow from the inlet aperture into the test article when the collet body is secured around the fitting.

2. The hydrostatic testing tool of claim 1, wherein the collet segments are biased toward an expanded position which they assume when the piston is in the withdrawn position.

3. The hydrostatic testing tool of claim 1, wherein the collet segments are arranged and configured to be able to move independently of one another.

4. The hydrostatic testing tool of claim 1, further comprising a spring within the generally hollow interior that pushes the piston against the collet segments and, in turn, the collet segments into a portion of the channel proximate the front cap where the channel narrows.

5. The hydrostatic testing tool of claim 1, wherein the inner surface of the channel proximate the front cap narrows as it extends toward the opening as to provide a ramp to force the collet segments together as they are pushed toward the opening.

6. The hydrostatic testing tool of claim 1, further comprising at least one spring located between adjacent collet segments.

7. The hydrostatic testing tool of claim 1, wherein the piston is arranged and configured such that it can push, the collet body into a narrowing in the channel proximate the front cap when the piston moves from the withdrawn position to the forward position.

8. The hydrostatic testing tool of claim 1, wherein the piston pulls is arranged and configured such that it can pull the collet body away from the opening in the front cap such that the diameter of the inner perimeter of the collet segments can expand when the piston is in the withdrawn position.

9. The hydrostatic testing tool of claim 1, wherein the collet body includes at least three collet segments.

10. The hydrostatic testing tool of claim 1, wherein the piston includes a front end having a face seal that can engage the end surface of the fitting when the fitting is inserted within the opening.

11. The hydrostatic testing tool of claim 1, wherein the piston includes a bleed hole located laterally outward to an outside diameter of the piston, wherein the bleed hole is in communication with the orifice.

12. The hydrostatic testing tool of claim 1, wherein the piston includes a groove and the collet body includes a lip, wherein the lip is positioned within the groove.

13. The hydrostatic testing tool of claim 12, wherein the lip can move horizontally within the groove as to allow the collet segments to move generally independently of each other.

14. The hydrostatic testing tool of claim 1, further comprising a handle assembly that actuates movement of the piston from the forward position to the withdrawn position to selectively vary the diameter of the inner perimeter.

15. The hydrostatic testing tool of claim 14, wherein the handle assembly includes a handle shaft that is pivotally connected to the piston and away from the body; wherein when the handle shaft is pushed toward the body, against the bias, the collet segments move from an unexpanded position to the expanded position.

16. The hydrostatic testing tool of claim 1, wherein the piston includes a front end having a seal that can engage the inner surface of the fitting when the fitting is inserted within the opening.

17. The hydrostatic testing tool of claim 16, wherein the front end protrudes from the piston and the seal circumscribes the protrusion.

* * * * *